United States Patent
Inderhees

[11] 3,720,454
[45] March 13, 1973

[54] OPTICAL FIELD CURVATURE CORRECTOR

[75] Inventor: John A. Inderhees, Cincinnati, Ohio

[73] Assignee: Avco Corporation, Cincinnatti, Ohio

[22] Filed: May 14, 1971

[21] Appl. No.: 143,533

[52] U.S. Cl. ...................................350/7, 350/285
[51] Int. Cl. .............................................G02b 17/00
[58] Field of Search..........350/6, 7, 43, 44, 184, 187, 350/204, 285, 287; 352/116

[56] References Cited

UNITED STATES PATENTS

| 1,356,787 | 10/1920 | Porter | 352/116 |
| 2,964,590 | 12/1960 | Gillette | 350/187 |
| 3,378,687 | 4/1968 | Schepler | 350/6 |
| 2,455,789 | 12/1948 | Luboshez | 352/116 |
| 1,618,090 | 2/1927 | Jenkins | 352/116 |

Primary Examiner—David Schonberg
Assistant Examiner—Michael J. Tokar
Attorney—Charles M. Hogan

[57] ABSTRACT

The invention is a device utilizing one or more carefully oriented optical prisms to alter the optical path length of a converging radiant-energy-ray bundle between the lens and the image plane of an optical system and to effect a focal correction in the information which may be collected through sequential scanning of the image plane.

1 Claim, 6 Drawing Figures

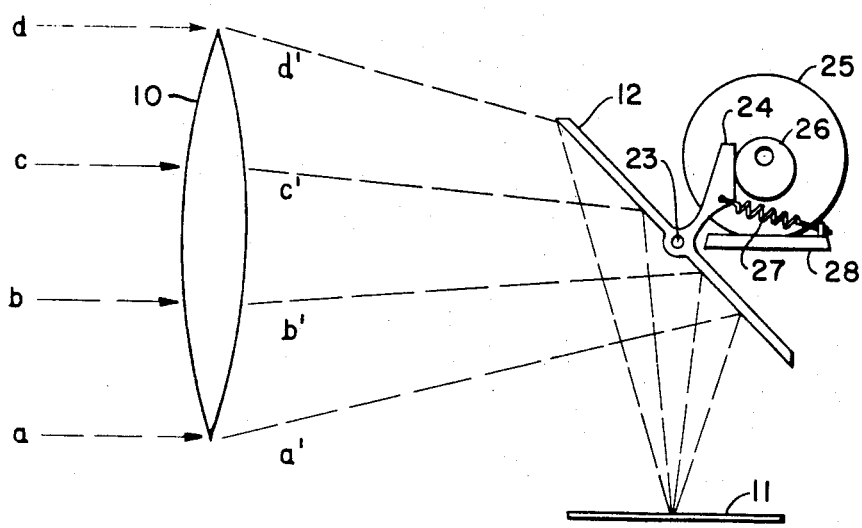
Fig. 1
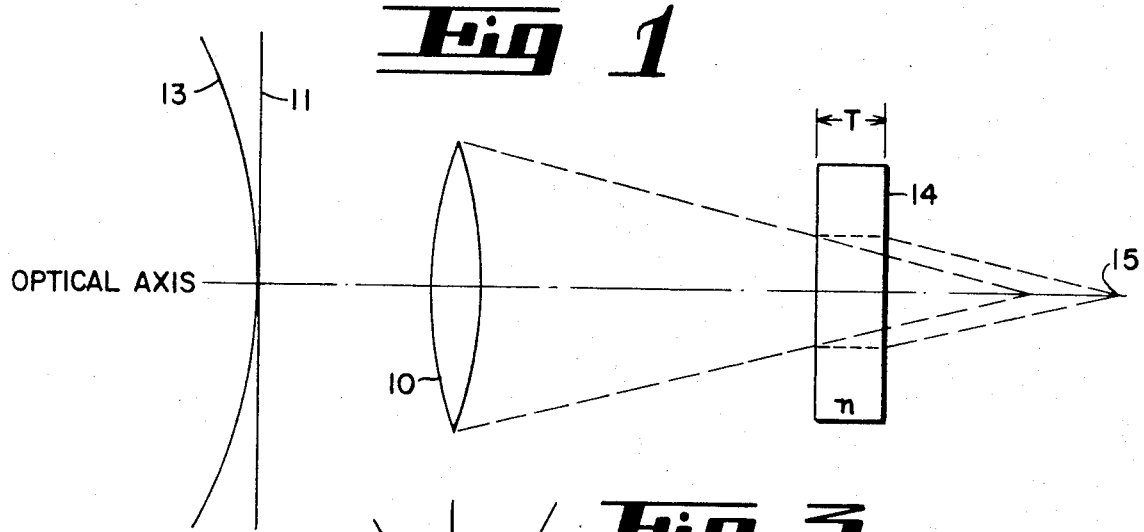
Fig. 3
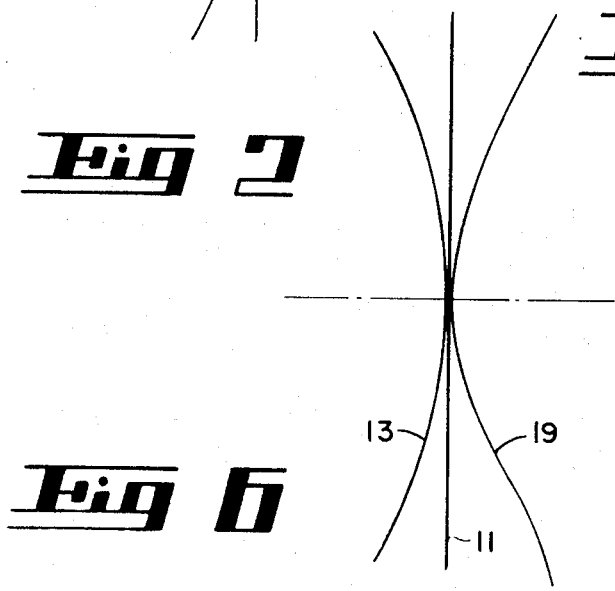
Fig. 2
Fig. 6
INVENTOR
JOHN A. INDERHEES
BY Charles M. Hogan
ATTORNEY

INVENTOR
JOHN A. INDERHEES

ATTORNEY

3,720,454

OPTICAL FIELD CURVATURE CORRECTOR

BACKGROUND

In prior art mechanical type scanning systems particularly where scanning is accomplished behind the lens or between the lens and focal plane, a change in optical path length occurs which causes undesirable defocussing. Various means and methods have been suggested to overcome this deficiency, but none has heretofore proved to be entirely satisfactory.

OBJECTIVES

A major object of the invention is to overcome the difficulties which have heretofore been met in efforts to increase the effectiveness of scanning an optically created image and to provide a controlled path-stretching optical correction which alters the path length to produce an accurate focus on a plane which can be effectively scanned by conventional electrical pickup devices.

Another object is to provide a field curvature corrector which is simple in construction and easy and effective in operation.

Other objects and advantages of the invention will more clearly appear when reference is had to the following specification and accompanying drawings in which:

BRIEF DESCRIPTION OF DRAWINGS

FIG. 1 is a diagrammatic showing in elevation of a simple optical system utilizing a conventional scanning mechanism;

FIG. 2 is a diagrammatic illustration of how a scanning device normally produces a curved focal plane or surface.

FIG. 3 shows diagrammatically how a parallel plate optical element is introduced behind the lens and alters the converging rays to change the focus;

FIG. 6 is a diagram, in side elevation, of a focal plane which has been corrected in accordance with the invention.

DETAILED DESCRIPTION

Figure 4:
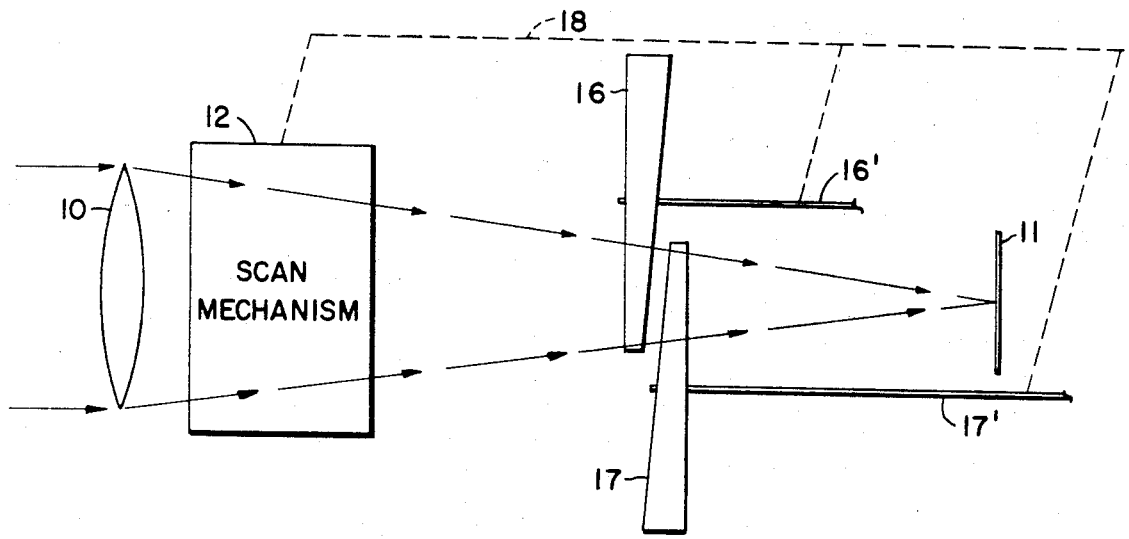
FIG. 4 illustrates diagrammatically the action of rotating wedges interposed between a scanning device and the focal plane of the optical system.

FIG. 1 depicts a conventional arrangement in which an optical scanner 12 of the mirror type, is interposed in the converging field of lens 10 for the purpose of depicting a scene on focal plane 11. In some applications the image depicted on focal plane 11 can be transformed into electrical pulses by means of photodiodes. In other applications, the image depicted on focal plane 11 may be recorded directly on photographic film. Use of the focal plane data finds application in many instrumentalities in the control, display or entertainment fields. The scanning mechanism depicted in FIG. 1 operates as follows.

Front surfaced mirror 12 pivots on axis 23. A cam follower arm 24 attached to the back of the mirror mechanism, rides on off-centered cam 26, which is attached to the shaft of synchronous motor 25. Motor 25 sits on base plate 28 which also serves to anchor axis 23 about which the mirror rotates. Spring 27 functions to make arm 24 remain in close contact with cam 26. Operationally, mirror 12 oscillates back and forth a few degrees whenever motor 25 is running. This oscillatory motion serves to cyclically scan a field of view to the left of lens 10 and image the scene on focal plane 11, which, for example, may contain photo sensors. The dashed lines $a, b, c, d$ shown in FIG. 1 represent parallel rays of radiant energy entering lens 10 and converging along paths $a', b', c', d'$ to a focal point on image plane 11.

As shown in FIG. 2, the position of best focus in such a system shifts as a smooth function of the scan angle either towards or away from the lens as indicated by curve 13.

In FIG. 3 a parallel plate of transparent material having an index of refraction greater than air is introduced between the lens 10 and the focal plane, thus shifting the converging ray effectually so that it focuses at a point 15, more distant from the lens than otherwise would occur. This shift in focus is a function of the thickness T of the material 14 and its index of refraction n according to the following formula $$x = T(n-1/n)$$

Correction of field curvature is shown in FIG. 4 in which two wedges 16 and 17 of suitable optical material are prepared so as to have a circular cross-section. They are axially mounted and introduced between the lens 10 and the focal plane 11 in overlapping relationship. By suitable means well known in the art, these wedges are mounted for rotation in the same direction about axes 16' and 17', the speed of rotation being mechanically synchronized with the scanning mechanism 12, as indicated by the dotted lines 18. Here the scan mechanism 12 is shown as being axially aligned with lens 10 and focal plane 11. This arrangement holds for the case where the scanning mechanism consists of a non-dispersive rotating cube of transparent material having an index of refraction different from that of air. Introduced in this manner, the two wedges vary their thickness in a periodic manner and the bending of the rays by each of the wedges individually is cancelled, since the bending by each wedge is in the opposite direction. It will be understood that the scanning mechanism may be of any conventional design which will sequentially scan the entire area of the focal plane and that the focal plane may be either axially aligned with the lens assembly or be off-axis as depicted in FIG. 1 for the case where a mirror scanner is used.

Figure 5:
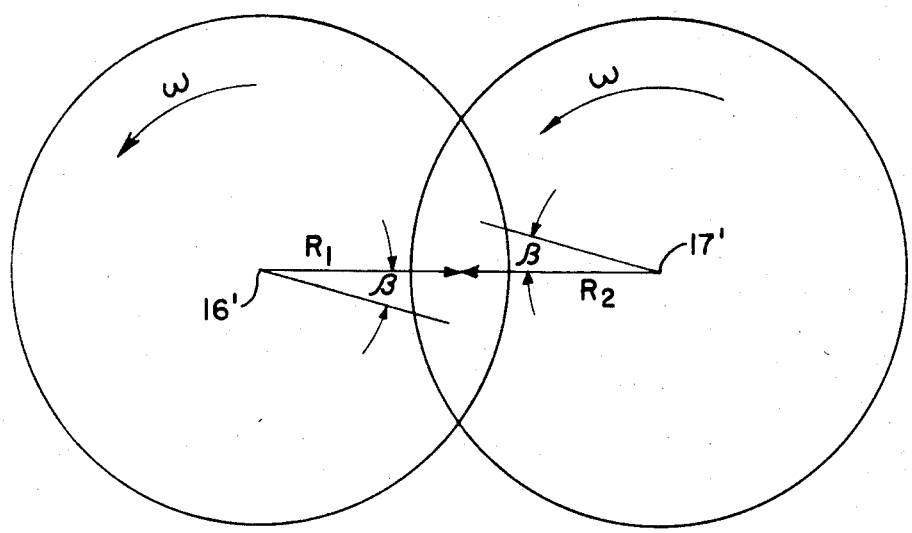
FIG. 5 is an end view of a rotating system according to FIG. 4 showing the direction of movement of the wedges and the geometry of their action.

Referring to FIGS. 4 and 5 and defining a reference angle of $\beta$ as zero when the two thin points of the wedges are aligned (as shown in FIG. 5) the combined thickness of the two wedges is:

$T = T_c + \alpha R_1 (1 - \cos \beta) + T_c + \alpha R_2 (1 - \cos \beta)$ when $R_1 = R_2$ $T + 2[T_c + \alpha R - \alpha R \cos \beta]$ where $T_c$ is thickness of wedge in center $\alpha$ is a constant determined by thickness change R is the radius.

When the wedges rotate in the same direction $\beta = \omega t$ and $T = 2[T_c + \alpha R - \alpha R \cos \omega t]$ It can be shown that at any angle of prism rotation of the two prisms, the thickness is the same in the area of overlap between the two prisms.

FIG. 6 shows the scan-induced field curvature 13 and the wedge correction curvature 19, which, when applied, permits accurate scanning over the flat focal plane 11.

DISCUSSION

It will be found that correcting the field curvature in accordance with the invention may not be entirely perfect, since the scan-induced field curvature and wedge correction are functions which are not necessarily always the same. However, the invention measurably improves the effectiveness of the scanning operation in equipment of this type. The invention permits the optical path length to lengthen or shrink sufficiently to accommodate off-axis scanning and maximizes the information available to the detectors at all angles.

A single rotating prism of circular cross-section can be used in place of the two prisms if the wedge can be placed very close to the focal plane and the angular deviations introduced by the wedge tolerated. In general, the corrections desired are small and the included angle between the faces of the prism is correspondingly small. In orienting prisms along an optical axis it is desirable to maintain the face of the prism on the side of the incoming radiant energy perpendicular to said optical axis. The face of the prism on the side of the departing radiant energy should likewise be maintained perpendicular to said axis.

It will be understood that the invention is not limited to an optical system for focusing light rays but may be adapted to a system in which infrared or other rays are focused on a screen for appropriate electronic pick-up.

Having thus described the invention, I claim as follows:

1. In an electro-optical scanning system the combination of
   a detector array formed with a frontal plane surface and having a central axis normal to said array,
   an optical lens having a focal point on said frontal plane,
   a tilting ray-deflecting scanner interposed between said lens and said detector array, said detector array and said optical lens and said tilting ray-deflecting scanner being characterized by optical field curvature for rays oblique to said axis, and means for compensating for said optical field curvature away from said plane due to the tilt of said tilting ray-deflecting scanner, said compensating means comprising:
   a pair of wedge shaped prisms individually mounted for rotation in the path between said tilting ray-deflecting scanner and said detector array,
   said prisms overlapping at said central axis and being synchronized to rotate in the same direction at such angular position relative to the tilt of said tilting ray-deflecting scanner as to compensate for said field curvature,
   the refraction due to one of said prisms being offset by the opposing refraction of the other prism, the thickness of the two prisms together varying as a function of said angular position.

* * * * *